Feb. 6, 1951  D. E. FARMER  2,540,870
AUTOMATIC REGULATION OF RAIL FLAW
DETECTION SENSITIVITY
Filed May 18, 1948

INVENTOR.
DANIEL E. FARMER
BY
Joseph H. Lipschutz
ATTORNEY

Patented Feb. 6, 1951

2,540,870

UNITED STATES PATENT OFFICE 2,540,870

AUTOMATIC REGULATION OF RAIL FLAW DETECTION SENSITIVITY

Daniel E. Farmer, Danbury, Conn., assignor to Sperry Products, Inc., Hoboken, N. J., a corporation of New York Application May 18, 1948, Serial No. 27,645

10 Claims. (Cl. 175—183)

This invention relates to rail flaw detector mechanisms of the type now employed on Sperry rail flaw detector cars. These cars run along the railroad tracks and pass current continuously through the rails between spaced contact brushes to set up an electromagnetic field surrounding the rail. Flaws in the rail caused by fissures are discovered by reason of the fact that they set up non-uniform regions in the said electromagnetic field. Such non-uniformities are detected by means of opposed induction coils maintained at a constant distance above the railhead. The coils normally cut a constant number of lines of force but on encountering a region of flaw, they cut a different number of lines of force to generate an E. M. F. which, after being suitably amplified, may be caused to operate indicating means. Such indicating means may take the form of a relay which, when energized with a predetermined voltage output from the amplifier is caused to attract its armature in the form of a recording pen operating on a moving chart which is geared to the wheels to move in predetermined relation to the movement of the car. In addition, the output of said relay, or of a separate relay, may be caused to actuate a paint gun to discharge paint on the rail in the region of flaw.

As stated above, the indicator relay was set to operate in response to a predetermined voltage output from the amplifier. However, the output from the amplifier was subject to several variations not caused by the flaw in the rail. One of these variations was due to the variation in the amplifier sensitivity and this required that the amplifier be calibrated at frequent intervals. Another variation in the amplifier output was the result of variation in amplifier input caused by the variation in running speed of the car, since the voltage induced in the induction coils which detect the fissure is a function of the speed with which said coils (carried by the car) cut the lines of flux. A third variation in the amplifier output was also due to a variation in amplifier input resulting from variation in the amount of current passed through the rail for the purpose of setting up the electromagnetic flux. Since the voltage induced in the detector coils is a product of the speed of the coils and the number of lines of force which the coils cut, it can be seen that variation in the amount of current in the rail resulted in a variation in the number of lines of force which the coils would cut.

It is one of the principal objects of this invention, therefore, to provide a method and means whereby the effect on the indicator relay of all of the above-mentioned variations will be minimized.

Still another variation in actuation of the flaw indicating means occurred in the indicator relay itself, which, by reason of its characteristics, as in the case of a Thyratron, required more or less voltage to actuate the indicator. Therefore, an induced voltage of a certain magnitude which might be sufficient to operate the indicator relay at one time would not be sufficient to operate the indicator if the relay's characteristic had changed so as to require a larger tripping voltage. Thus, certain small fissures which, under certain circumstances would indicate, would, under the condition of a different relay characteristic, not be indicated and would therefore be missed. It is, therefore, another object of this invention to provide a method and means whereby the variations in relay characteristics will have a greatly reduced effect on the flaw indicating means than was heretofore the case.

Further objects and advantages of this invention will become apparent in the following detailed description thereof.

In the accompanying drawings.

Figure 1:
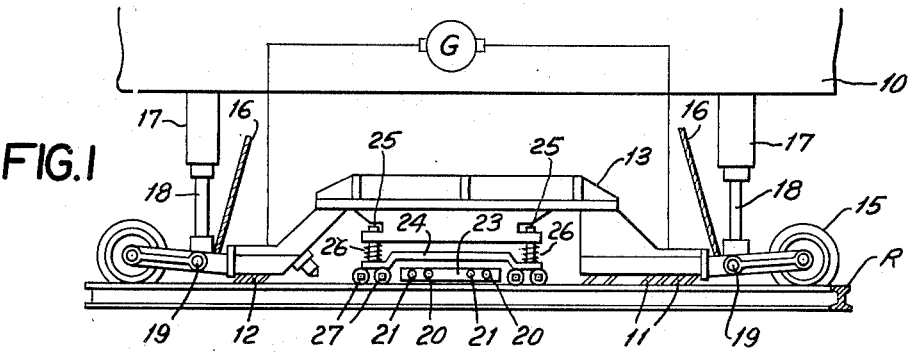
Fig. 1 is a side view of a portion of a Sperry rail fissure detector car having my invention applied thereto.

Referring to Fig. 1 of the drawings, there are shown the parts of a standard Sperry rail fissure detector car which includes a car body 10, operating along the rails R. Fissure detection is accomplished by passing current through each rail from a generator G within the car body supplying current to spaced current brushes 11 and 12 supported upon the current brush carriage 13 which when in lowered or effective position is adapted to ride upon the rail by means such as wheels 15. The current brush carriage 13 is normally held in elevated or ineffective position by means of springs (not shown) and cables 16, but when it is desired to lower said carriage, fluid pressure such as compressed air is supplied to the cylinders 17 to force out pistons 18 which are pivotally connected at 19 to the current brush carriage 13. The current passed through the rail by way of spaced brushes 11 and 12 will establish an electromagnetic field surrounding the rail and this field will be uniform except in the region of flaw where it will be distorted. Such distortions of the electromagnetic field are detected by a flaw responsive mechanism which may take the form of pairs of opposed induction coils 20 and 21 supported in a housing 23 at a constant distance above the rail surface by means of a carriage 24. Said carriage 24 is mounted on current brush carriage 13 by means of loosely fitting bolts 25 and springs 26 to permit the carriage 24, while riding on the rail on means such as wheels 27, to move independently of carriage 13 so that said carriage 24 may at all times maintain parallelism with the rail surface regardless of irregularities thereof.

The flaw responsive mechanism may include a plurality of pairs of coils, two such pairs 20 and 21 being shown in the present instance. Each pair of coils is connected in series and oppositely wound so that variations in flux, such as variations in the current supply or equal variations in the distance of the coils above the rail, will affect both equally and oppositely. On entering a region of flaw, however, first one and then the other of the coils of each pair will cut a different number of lines of force from that which was previously cut and thus there will be generated an E. M. F. This E. M. F. may be amplified by an amplifier 27, and when the output of said amplifier exceeds a predetermined voltage, it will energize relay 30 to cause it to attract its armature 31 which carries a pen P operating on a moving chart C geared to the car wheel. The pen P will thus make a notch in the otherwise straight line which it draws and said notch will indicate the region of flaw.

From the above description of the standard mechanism of a Sperry rail flaw detector car, it is quite apparent that the relay 30 requires a certain tripping voltage to operate pen P and it is further apparent that this tripping voltage may be affected by any one of the four factors mentioned in the introduction hereto, i. e. (1) variations in the sensitivity of amplifier 27, (2) the speed of the car, (3) the current in the rail, and hence the number of lines of force, and (4) variations in the sensitivity of the relay. My invention provides means for minimizing the effect of all these variations, as will be described hereinafter.

The relay 30 will attract its armature or pen 31 against the action of restraining spring 32 when output from amplifier 27 exceeds a predetermined minimum voltage. This minimum voltage is the voltage represented by the net E. M. F. generated by the searching coils when passing over the smallest size defect which it is desired to detect, when amplified by amplifier 27 at a predetermined sensitivity. Thus, if the amplifier sensitivity should drift lower, or if the current through the rail should drop, or if the speed of the car should be reduced, or any combination of these should occur, it is apparent that the output voltage from amplifier 27 may not be sufficient to cause coil 30 to attract its armature 31 against the action of spring 32, and therefore the output voltage generated when the coils pass a minimum defect would not be indicated. The first of these variations can be eliminated by making amplifier 27 of the constant gain type which is based upon the principle of degenerative feed-back from the output of the amplifier to its input. Such amplifiers are well known and the details thereof, therefore, need not be described.

The other two variations in amplifier output in response to the coils passing over a defect are due to variations in the amount of current passed through the rail between current brushes 11 and 12 and variations in the speed of the car. In order to minimize the effect on the indicator of variations in the amount of current in the rail and variations in the speed of the car, I provide the following method and means.

Heretofore the net voltage generated by a pair of electrically opposed detector coils such as coils 20, on entering a region of flaw was applied to the actuation of the relay 30 after being amplified by a suitable amplifier such as amplifier 27. The relay was set so that the voltage output from amplifier 27 in response to the detector coils passing over the minimum sized fissure to be detected (say 5%) with full energization of the rail and maximum testing speed of the car would be just sufficient to actuate the pen 31. So that, for example, if the voltage output under the aforesaid conditions was 1 volt, the relay was set so that it would require at least 1 volt to actuate the pen. If, however, the car speed diminished or the amount of current in the rail diminished, then it is obvious that a smaller amount of voltage output would be obtained from amplifier 27 in response to the same sized fissure, and therefore the pen would not be actuated. Under these conditions it would require a much larger sized fissure to actuate the pen, and therefore smaller sized fissures which would be detected with full energization and maximum car speed would not be detected with diminished energization and car speed. For example, assume that the voltage generated by coils has been cut in half due to reduced car speed, reduced rail current, or both. Under these conditions, the following table will give the resulting operative output from amplifier 27:

[Not using differential]

| Per cent fissure | With full energization and maximum speed to yield maximum output of amplifier 27 | With reduced energization and speed to yield half output of amplifier 27 |
|---|---|---|
| | Volts | Volts |
| 5 | 1.0 | .5 |
| 6 | 1.2 | .6 |
| 7 | 1.4 | .7 |
| 8 | 1.6 | .8 |
| 9 | 1.8 | .9 |
| 10 | 2.0 | 1.0 |

From the above table it is apparent that if the relay is set to operate at 1 volt a 5% fissure will be detected with full energization and maximum car speed, but the smallest fissure which will be detected when the amplifier output is cut in half is a 10% fissure, and all fissures of smaller size than 10% will not be detected.

Figure 2:
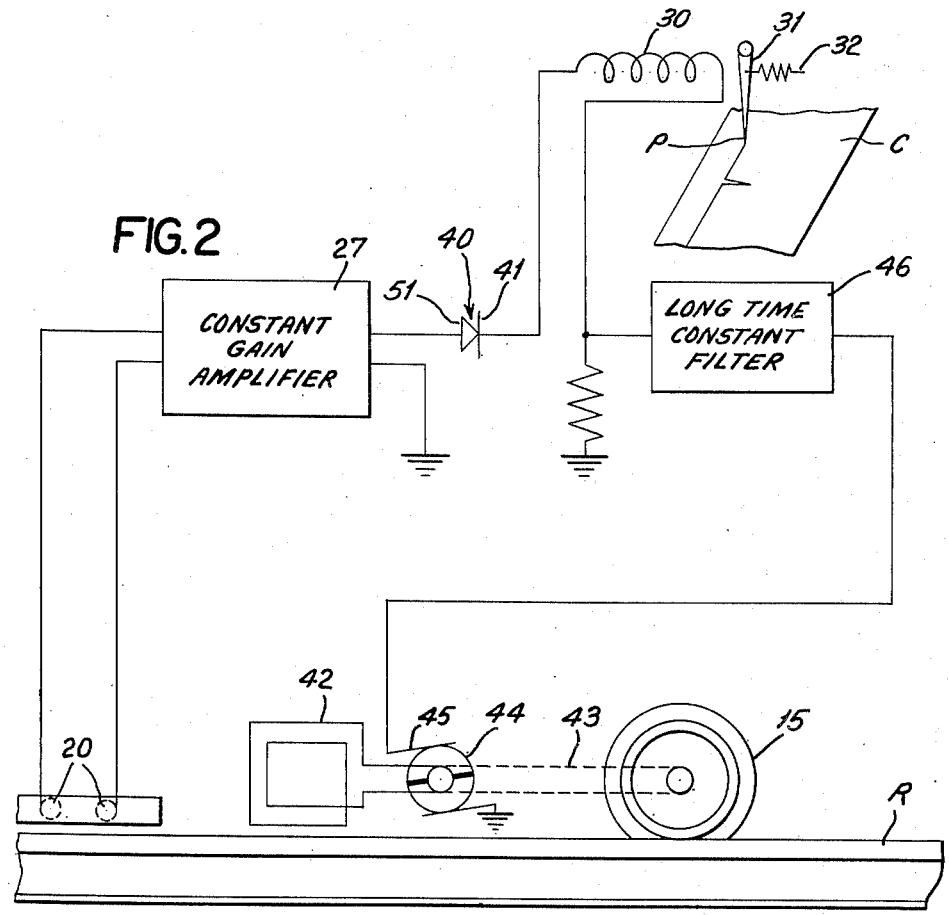
Fig. 2 is a view consisting mainly of wiring diagram illustrating the principle of this invention.

By the arrangement shown in Fig. 2 I produce a far more stable system which will be only slightly affected by large variations in rail energization and car speed. For this purpose I operate not upon the principle of utilizing the absolute value of the voltage output of amplifier 27, but rather on the principle of opposing such output with another voltage of comparable magnitude and utilizing only the small differential between the two. Thus, for instance, if in response to the smallest fissure to be detected, say 5%, and with full energization of the rail and maximum car speed the output from amplifier 27 is 1 volt, I may oppose this output by a voltage on the order of .9 volt generated by coil 42 rotated in proximity to the rail by means of a driving connection 43 from the car wheel 15 so that the amount of voltage induced in coil 42 will be a function of the speed of the car and the energization of the rail. The number of turns of coil 42 is such as to generate a voltage on the order of .9 volt when the rail is receiving full current energization and the car is traveling at maximum operating speed. This voltage may be taken off a commutator 44 on driving connection 43 by means of brushes 45. Under these conditions when coils 20 pass over a minimum fissure of 5% there will be generated a differential voltage in the rectifier or diode 40 of $\frac{1}{10}$ volt, the voltage generated by coil 42 being applied to one element 41 of the diode and the voltage output of amplifier 27 being applied to the other element 51 of the diode. Normally there is voltage on plate 41, but only when a fissure is encountered is there voltage on element 51, and only when the voltage on element 51 exceeds the voltage on element 41 will current pass to the relay 30. The voltage output of amplifier 27 will generate a voltage in excess of the voltage on plate 41 when the coils 20 encounter a fissure of minimum size or greater, in the example cited, 5%. The voltage generated by coil 42 is not responsive to fissures because the voltage is passed through a filter 46 having a long time constant which, therefore, does not respond to the short-period variations characteristic of fissures. Only the coils 20, therefore, will respond to a fissure.

By utilizing only the differential output from diode 40 I may employ a very small differential, such as .1 volt. It is true that should the output of amplifier 27 and coil 42 be reduced to half through reduced energization of the rail or through reduced car speed, the .1 volt differential will be reduced to .05 volt differential. While the percentage reduction in differential is high (50%), the amount of voltage reduction is small. The relay 30 can be made so that pen 31 is actuated in response to .1 volt differential so that a 5% fissure will be the smallest to be indicated. It will be seen that if the differential is reduced to .05 volt the pen 31 will not be energized. However, it is necessary to raise the voltage generated by coils 20 through the amplifier 27 by only .05 volt in order to actuate the pen 31. This does not require that the coils 20 pass over a fissure twice the size of the minimum, i. e., a 10% fissure, but only that it pass over a fissure slightly larger than 5% and less than 6%. This becomes apparent from the following table:

[Using differential]

| Per cent fissure | With full energization and maximum speed to yield maximum output of amplifier 27 | | | With reduced energization and speed to yield half output of amplifier 27 | | |
|---|---|---|---|---|---|---|
| | Output of 27 | Output of 46 | Diff. | Output of 27 | Output of 46 | Diff. |
| 5 | 1.0 | .9 | .1 | .5 | .45 | .05 |
| 6 | 1.2 | .9 | .3 | .6 | .45 | .15 |
| 7 | 1.4 | .9 | .5 | .7 | .45 | .25 |
| 8 | 1.6 | .9 | .7 | .8 | .45 | .35 |
| 9 | 1.8 | .9 | .9 | .9 | .45 | .45 |
| 10 | 2.0 | .9 | 1.0 | 1.0 | .45 | .55 |

From the above table it becomes apparent that a fissure of less than 6% will provide a differential output in excess of the .1 volt necessary to actuate the pen 31. Thus, whereas in the case of the arrangement heretofore used where the absolute voltage generated by coils 20 was utilized without opposing a differential voltage, it required a fissure twice the size to actuate the indicator if the reduced rail energization and car speed cut the induced voltage in half, with the present arrangement, using a differential voltage, and a more sensitive relay, it is only necessary to encounter a fissure less than 1% larger than the minimum in order to actuate said indicator.

Applicant's arrangement also will take care of variations in relay characteristics which occur, for example, when the type of relay employed is a Thyratron. Such variation in relay characteristics may mean that instead of operating the pen in response to .1 differential, the relay may not operate until .2 volt is applied thereto. In this case, it will be seen from the above table that a fissure of less than 6% size would yield a differential in excess of .2 volt, and therefore all fissures of 6% or more in size would be indicated. In the system heretofore used without passing a differential voltage it will be seen that if the voltage necessary to operate the relay rose from 1.0 volt to 2.0 volts, i. e., the voltage necessary to operate the relay was doubled, the smallest fissure that would come through would be a 10% fissure and all fissures of smaller size would not be indicated.

Having a described my invention, what I claim and desire to secure by Letters Patent is:

1. In a rail flaw detector car having means for energizing the rail with flux, means responsive to said flux and adapted to generate a voltage which is a function of the speed of the car, the flux surrounding the rail and the short-period flux distortion caused by a rail defect, a second means responsive to flux and adapted to generate a voltage which is a function of the speed of the car, the flux surrounding the rail and the short-period flux distortion caused by a defect, means for filtering out said short-period flux distortion voltages generated by said second responsive means, means for opposing the voltage generated by said first responsive means against the voltage delivered by said second responsive means after filtering, indicating means, and means for actuating the indicating means in response to the differential of said voltages.

2. In a rail flaw detector car having means for energizing the rail with flux, inductive means responsive to said flux and adapted to generate a voltage which is a function of the speed of the car, the flux surrounding the rail and the short-period flux distortion caused by a rail defect, a second inductive means responsive to flux and adapted to generate a voltage which is a function of the speed of the car, the flux surrounding the rail and the short-period flux distortion caused by a defect, means for filtering out said short-period flux distortion voltages generated by said second responsive means, means for opposing the voltage generated by said first inductive means against the voltage delivered by said second inductive means after filtering, indicating means, and means for actuating the indicating means in response to differential of said voltages.

3. In a rail flaw detector car having means for energizing the rail with flux, means responsive to flux and adapted to generate a voltage which is a function of the speed of the car, the flux surrounding the rail and the flux distortion caused by a rail defect, a second means responsive to flux and adapted to deliver a voltage which is a function of the speed of the car and the flux surrounding the rail, but not of the flux distortion caused by a defect, means for opposing the voltage generated by said first responsive means against the voltage delivered by said second responsive means, indicating means, and means for actuating the indicating means in response to the differential of said voltages, said last named means comprising a diode, means for applying to the diode the voltage delivered by said second responsive means, in a direction to render the diode non-conducting, and means for applying to the diode the voltage delivered by said first responsive means, in a direction to render the diode conducting.

4. In a rail flaw detector car having means for energizing the rail with flux, a pair of equal opposed inductive means each responsive to such flux and adapted to generate a voltage which is a function of the speed of the car, the flux surrounding the rail and the short-period flux distortion caused by a rail defect, a third means responsive to flux and adapted to generate a voltage which is a function of the speed of the car, the flux surrounding the rail and the short-period flux distortion caused by a defect, means for filtering out said short-period flux distortion voltages generated by said third responsive means, means for opposing the net voltage generated by the pair of inductive means against the voltage delivered by said third responsive means after filtering to yield a differential voltage, indicating means, and means for actuating said indicating means in response to said differential voltage.

5. In a rail flaw detector car having means for energizing the rail with flux, a pair of equal opposed induction coils arranged in tandem along the rail, each coil generating a voltage which is a function of the speed of the car, the flux surrounding the rail and the flux distortion caused by a rail defect, whereby a net voltage will be generated when a rail defect is encountered, a rotatable induction coil positioned in the flux field surrounding the rail, means for rotating said coil as a function of the car speed whereby said rotatable coil will generate a voltage which is a function of the speed of the car, the flux surrounding the rail and the flux distortion caused by a rail defect, said flux distortion caused by a rail defect being adapted to generate short-period voltages, means for filtering out said short-period voltages, means for opposing said net voltage against the voltage generated by said rotatable coil after passing through the filter, whereby a differential voltage is obtained, indicating means, and means for actuating the indicating means in response to said differential voltage.

6. In a rail flaw detector car having means for energizing the rail with flux, a pair of equal opposed induction coils arranged in tandem along the rail, each coil generating a voltage which is a function of the speed of the car, the flux surrounding the rail and the flux distortion caused by a rail defect, whereby a net voltage will be generated when a rail defect is encountered, a rotatable induction coil positioned in the flux field surrounding the rail, means for rotating said coil as a function of the car speed whereby said rotatable coil will generate a voltage which is a function of the speed of the car, the flux surrounding the rail and the flux distortion caused by a rail defect, said flux distortion caused by a rail defect being adapted to generate short-period voltages, means for filtering out said short-period voltages, means for opposing said net voltage against the voltage generated by said rotatable coil after passing through the filter, whereby a differential voltage is obtained, indicating means, and means for actuating the indicating means in response to said differential voltage, said last named means comprising a diode, means for applying to the diode the voltage generated by the rotatable coil after passing through the filter, in a direction to render the diode non-conducting, and means for applying said net voltage to the diode in a direction to render the diode conducting.

7. In a rail flaw detector car having means for energizing the rail with flux, means responsive to said flux and adapted to generate a voltage which is a function of the speed of the car, the flux surrounding the rail and the short-period flux distortion caused by a rail defect, a constant gain amplifier for amplifying the generated voltage, a second means responsive to flux and adapted to generate a voltage which is a function of the speed of the car, the flux surrounding the rail and the short-period flux distortion caused by a defect, means for filtering out said short-period flux distortion voltages generated by said second responsive means, means for opposing the output of said amplifier against the voltage delivered by said second responsive means after filtering, indicating means, and means for actuating the indicating means in response to the differential of said voltages.

8. In a rail flaw detector car having means for energizing the rail with flux, means responsive to flux and adapted to generate a voltage which is a function of the speed of the car, the flux surrounding the rail and the flux distortion caused by a rail defect, a constant gain amplifier for amplifying the generated voltage, a second means responsive to flux and adapted to deliver a voltage which is a function of the speed of the car and the flux surrounding the rail, but not of the flux distortion caused by a defect, means for opposing the output of said amplifier against the voltage delivered by said second responsive means, indicating means, and means for actuating the indicating means in response to the differential of said voltages, said last named means comprising a diode, means for applying to the diode the voltage delivered by said second responsive means, in a direction to render the diode non-conducting, and means for applying to the diode the output of said amplifier, in a direction to render the diode conducting.

9. In a rail flaw detector car having means for energizing the rail with flux, a pair of equal opposed induction coils arranged in tandem along the rail, each coil generating a voltage which is a function of the speed of the car, the flux surrounding the rail and the flux distortion caused by a rail defect, whereby a net voltage will be generated when a rail defect is encountered, a constant gain amplifier for amplifying said net voltage, a rotatable induction coil positioned in the flux field surrounding the rail, means for rotating said coil as a function of the car speed whereby said rotatable coil will generate a voltage which is a function of the speed of the car, the flux surrounding the rail and the flux distortion caused by a rail defect, said flux distortion caused by a rail defect being adapted to generate short-period voltages, means for filtering out said short-period voltages, means for opposing the output of said amplifier against the voltage generated by said rotatable coil after passing through the filter, whereby a differential voltage is obtained, indicating means, and means for actuating the indicating means in response to said differential voltage.

10. In a rail flaw detector car having means for energizing the rail with flux, a pair of equal opposed induction coils arranged in tandem along the rail, each coil generating a voltage which is a function of the speed of the car, the flux surrounding the rail and the flux distortion caused by a rail defect, whereby a net voltage will be generated when a rail defect is encountered, a constant gain amplifier for amplifying said net voltage, a rotatable induction coil positioned in the flux field surrounding the rail, means for rotating said coil as a function of the car speed whereby said rotatable coil will generate a voltage which is a function of the speed of the car, the flux surrounding the rail and the flux distortion caused by a rail defect, said flux distortion caused by a rail defect being adapted to generate short-period voltages, means for filtering out said short-period voltages, means for opposing the output of said amplifier against the voltage generated by said rotatable coil after passing through the filter, whereby a differential voltage is obtained, indicating means, and means for actuating the indicating means in response to said differential voltage, said last named means comprising a diode, means for applying to the diode the voltage generated by the rotatable coil after passing through the filter, in a direction to render the diode non-conducting, and means for applying to the diode the output of said amplifier, in a direction to render the diode conducting.

DANIEL E. FARMER.

REFERENCES CITED

The following references are of record in the file of this patent:

UNITED STATES PATENTS

| Number | Name | Date |
| --- | --- | --- |
| Re. 18,555 | Sperry | Aug. 2, 1932 |
| 1,954,975 | Zuschlag | Apr. 17, 1934 |
| 2,228,294 | Wurzbach | Jan. 14, 1941 |
| 2,290,330 | Irwin | July 21, 1942 |